(12) United States Patent
Charron et al.

(10) Patent No.: US 10,810,267 B2
(45) Date of Patent: Oct. 20, 2020

(54) CREATING A UNIFORM RESOURCE IDENTIFIER STRUCTURE TO REPRESENT RESOURCES

(71) Applicant: INTERNATIONAL BUSINESS MACHINES CORPORATION, Armonk, NY (US)

(72) Inventors: David S. Charron, Rochester, MN (US); Kyle E. Gilbertson, Rochester, MN (US); Rafal P. Konik, Oronoco, MN (US); Nicholas T. Lawrence, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 665 days.

(21) Appl. No.: 15/291,972

(22) Filed: Oct. 12, 2016

(65) Prior Publication Data

US 2018/0101781 A1    Apr. 12, 2018

(51) Int. Cl.
*G06F 16/951*  (2019.01)
*G06F 16/954*  (2019.01)
(Continued)

(52) U.S. Cl.
CPC .......... *G06F 16/951* (2019.01); *G06F 16/955* (2019.01); *G06N 5/022* (2013.01)

(58) Field of Classification Search
CPC .... G06F 16/3338; G06F 16/35; G06F 16/353; G06F 16/355; G06F 16/367;
(Continued)

(56) References Cited

U.S. PATENT DOCUMENTS 7,293,012 B1    11/2007  Solaro et al.
7,904,405 B2 *   3/2011  Jung ...................... G06Q 30/06
                                            706/47
(Continued)

OTHER PUBLICATIONS

Hayashi, "LMF-aware Web services for accessing semantic lexicons", 2012 (Year: 2012).*

(Continued)

*Primary Examiner* — Ann J Lo
*Assistant Examiner* — Van C Mang
(74) *Attorney, Agent, or Firm* — The Steadman Law Firm PLLC

(57) ABSTRACT

An approach is described of structuring resources among a plurality of resources in a system architecture. A method pertaining to such approach may include accessing a knowledge base including attributes relevant to the plurality of resources. The attributes of the knowledge base may include concepts and logical relationships associated with the concepts. The method further may include, responsive to receiving at least one resource to be processed with respect to the plurality of resources, extracting characteristics from the at least one resource based upon the attributes of the knowledge base, and storing the extracted characteristics in a repository. The method further may include, responsive to an application request, creating a URI structure representing at least one matching resource among the plurality of resources that corresponds to the application request.

20 Claims, 6 Drawing Sheets

(51) Int. Cl.
*G06N 5/02* (2006.01)
*G06F 16/955* (2019.01)

(58) Field of Classification Search
CPC ..... G06F 16/951; G06F 9/468; H04L 63/101; H04L 67/10; H04L 9/3239
See application file for complete search history.

(56) References Cited

U.S. PATENT DOCUMENTS

| | | | |
|---|---|---|---|
| 8,078,625 | B1 | 12/2011 | Zhang et al. |
| 8,255,480 | B2 | 8/2012 | Bedingfield, Sr. et al. |
| 8,447,829 | B1 * | 5/2013 | Geller ............... G06F 9/468 709/217 |
| 8,793,488 | B1 * | 7/2014 | Forristal ............ H04L 63/0281 709/201 |
| 2006/0143195 | A1 * | 6/2006 | Ornstein ............. G06F 40/14 |
| 2006/0184866 | A1 * | 8/2006 | Rees .................. G06F 16/80 715/207 |
| 2007/0124414 | A1 | 5/2007 | Bedingfield, Sr. et al. |
| 2007/0174270 | A1 * | 7/2007 | Goodwin ............ G06F 16/951 |
| 2009/0063538 | A1 | 3/2009 | Chitrapura et al. |
| 2009/0171986 | A1 | 7/2009 | Chitrapura et al. |
| 2009/0240670 | A1 | 9/2009 | Tiyyagura et al. |
| 2010/0070448 | A1 * | 3/2010 | Omoigui ............ H01L 27/1463 706/47 |
| 2011/0047169 | A1 * | 2/2011 | Leighton ............ G16H 50/70 707/756 |
| 2013/0246049 | A1 * | 9/2013 | Mirhaji ............. G06F 17/274 704/9 |
| 2015/0269139 | A1 * | 9/2015 | McAteer ........... G06F 17/2785 704/9 |

OTHER PUBLICATIONS

Fredrich, Todd. RESTful Service Best Practices. www.RestApiTutorial.com, May 29, 2012 [34 pages]. <http://www.restapitutorial.com/media/RESTful_Best_Practices-v1_1.pdf>.

Apriori Algorithm. Wikipedia, accessed on Sep. 27, 2016 [3 pages]. <https://en.wikipedia.org/wiki/Apriori_algorithm>.

Hearst, Marti A. Automatic Acquisition of Hyponyms from Large Text Corpora. Proc. of Coling-92, Nantes, France, Aug. 23-28, 1992, pp. 539-545. <http://www.aclweb.org/anthology/C92-2082>.

Fan, James et al. Prismatic: Inducing Knowledge from a Large Scale Lexicalized Relation Resource. Proceedings of the NAACL HLT 2010 First International Workshop on Formalisms and Methodology for Learning by Reading, Los Angeles, CA, Jun. 2010, pp. 122-127. <http://www.aclweb.org/anthology/W10-0915>.

* cited by examiner

| Resource ID | Concept ID | Concept Value |
|---|---|---|
| document-001 | type | neuroendocrine |
| document-001 | site | pancreas |
| document-002 | type | islet_cell |
| document-003 | type | Merkel_cell |
| document-003 | site | skin |

FIG. 4

| Request | Response |
|---|---|
| /type | PATHS:<br>/type/neuroendocrine<br>/type/islet_cell<br>/type/Merkel_cell<br><br>MATCHING RESOURCES:<br>document-001<br>document-002<br>document-003 |
| /site | PATHS:<br>/site/pancreas<br>/site/skin<br><br>MATCHING RESOURCES:<br>document-001<br>document-003 |
| /type/neuroendocrine | PATHS:<br>/type/neuroendocrine/hypernym<br><br>MATCHING RESOURCES:<br>document-001<br>document-002<br>document-003 |
| /type/neuroendocrine/hypernym | PATHS:<br>/type/neuroendocrine/hypernym/type<br><br>MATCHING RESOURCES:<br>document-002<br>document-003 |
| /type/neuroendocrine/hypernym/type | PATHS:<br>/type/neuroendocrine/hypernym/type/islet_cell<br>/type/neuroendocrine/hypernym/type/Merkel_cell<br><br>MATCHING RESOURCES:<br>document-002<br>document-003 |
| /site/pancreas/site-tumors/type | PATHS:<br>/site/pancreas/site-tumors/type/islet_cell<br><br>MATCHING RESOURCES:<br>document-002 |

FIG. 6

CREATING A UNIFORM RESOURCE IDENTIFIER STRUCTURE TO REPRESENT RESOURCES

BACKGROUND

The various embodiments described herein generally relate to representation of resources. More specifically, the various embodiments describe techniques of creating a Uniform Resource Identifier (URI) structure to represent resources.

In accordance with a modern system architecture (e.g., a web services architecture such as representational state transfer (REST) or simple object access protocol (SOAP)), resources may be represented hierarchically. However, attributes associated with the resources, particularly latent concepts and relationships, may not be clearly defined by conventional representation techniques. Additionally, a lack of organizational consistency and use of ambiguous terminology may present issues with respect to structuring resources according to conventional representation techniques.

SUMMARY

The various embodiments described herein provide techniques of structuring resources among a plurality of resources in a system architecture. An associated method may include accessing a knowledge base including attributes relevant to the plurality of resources. The knowledge base may be accessed via a processor. The method further may include, responsive to receiving at least one resource to be processed with respect to the plurality of resources, extracting characteristics from the at least one resource based upon the attributes of the knowledge base, and storing the extracted characteristics in a repository. The method further may include, responsive to an application request, creating a Uniform Resource Identifier (URI) structure, wherein the URI structure represents at least one matching resource among the plurality of resources that corresponds to the application request.

In an embodiment, establishing the knowledge base according to the method may include populating the knowledge base by collecting information from at least one data source and further may include training the knowledge base by determining attributes from the collected information. Additionally, establishing the knowledge base may include retraining the knowledge base. Attributes of the knowledge base may include concepts and logical relationships associated with the concepts. Furthermore, the extracted characteristics may include concept identifiers and concept values defined for the concepts of the knowledge base.

In a further embodiment, the method step of creating the URI structure may include accessing the attributes of the knowledge base and accessing from the repository identification information and at least one characteristic of the at least one matching resource. Furthermore, creating the URI structure may include generating a URI set based upon the attributes of the knowledge base. The generated URI set may include at least one URI path reflecting the at least one characteristic of the at least one matching resource. The at least one characteristic reflected by the at least one URI path may include one or more logical relationships associated with the at least one matching resource. Additionally, the at least one URI path may reflect at least one characteristic that is at least one hierarchical level beyond a hierarchical level of the at least one characteristic of the at least one matching resource.

An additional embodiment includes a computer program product including a computer readable storage medium having program instructions embodied therewith. According to such embodiment, the program instructions may be executable by a computing device to cause the computing device to perform one or more steps of above recited method. A further embodiment includes a system having a processor and a memory storing an application program, which, when executed on the processor, performs one or more steps of the above recited method.

BRIEF DESCRIPTION OF THE DRAWINGS

So that the manner in which the above recited aspects are attained and can be understood in detail, a more particular description of embodiments, briefly summarized above, may be had by reference to the appended drawings.

Note, however, that the appended drawings illustrate only typical embodiments of this invention and are therefore not to be considered limiting of its scope, for the invention may admit to other equally effective embodiments.

FIG. 4 illustrates a table including characteristics extracted from resources processed with respect to a plurality of resources, according to an example implementation.

FIG. 6 illustrates a table including respective URI sets generated in response to various example application requests, according to an example implementation.

DETAILED DESCRIPTION

Figure 1:
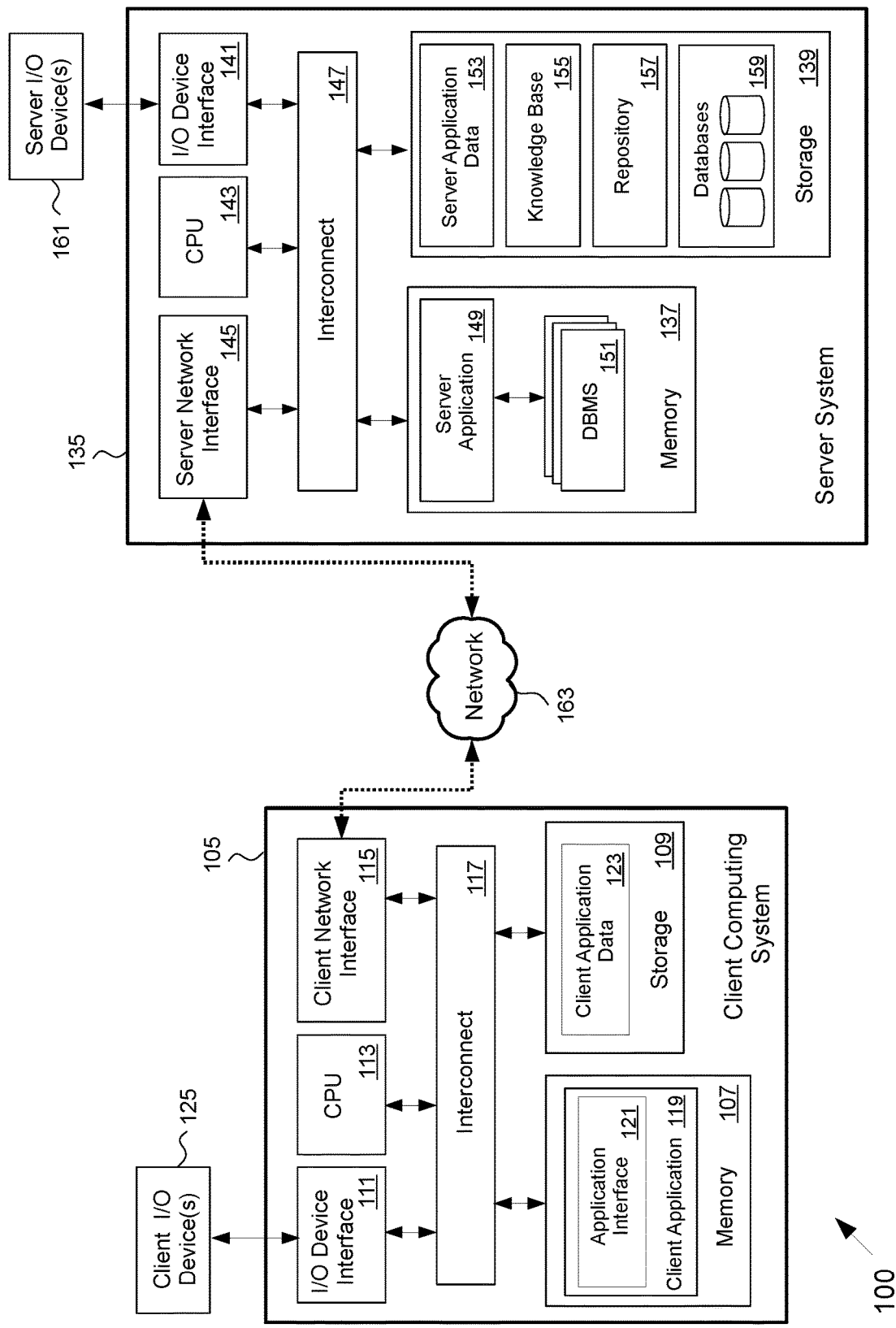
FIG. 1 illustrates a computing infrastructure, according to an embodiment.

The various embodiments described herein are directed to techniques of structuring resources among a plurality of resources. Specifically, the various embodiments are directed to techniques of creating a Uniform Resource Identifier (URI) structure to represent resources in a system architecture (e.g., a web services architecture such as representational state transfer (REST) or simple object access protocol (SOAP)). The various embodiments focus in particular upon creating a set of one or more URIs in accordance with a classification system that may fully leverage a hierarchical URI structure. According to the various embodiments, characteristics pertaining to concepts and logical relationships may be extracted from resources based upon attributes of a knowledge base, and such characteristics may be reflected in a URI set created in response to an application request.

The various embodiments described herein may have advantages over conventional techniques. Specifically, creating a URI structure according to the various embodiments described herein may facilitate precise identification of resources and any relationships among such resources, including latent relationships that may not be readily discoverable or accessible. Furthermore, the various embodiments may facilitate consistent organization of resources in rapidly advancing fields, such as technology or medicine.

Additionally, the various embodiments may facilitate use of standardized terminology in the context of representing resources. Some of the various embodiments may not include all such advantages, and such advantages are not necessarily required of all embodiments.

In the following, reference is made to various embodiments of the invention. However, it should be understood that the invention is not limited to specific described embodiments. Instead, any combination of the following features and elements, whether related to different embodiments or not, is contemplated to implement and practice the invention. Furthermore, although embodiments may achieve advantages over other possible solutions and/or over the prior art, whether or not a particular advantage is achieved by a given embodiment is not limiting. Thus, the following aspects, features, embodiments, and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions also may be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions also may be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The various embodiments described herein may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in the cloud, without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of this disclosure, workloads of a client computing system or server system running an application according to the various embodiments described herein may be deployed to a computing cloud. Moreover, cloud-based database systems, virtual machines, and a variety of other server applications may be used to manage such workloads.

Particular embodiments describe techniques for creating a URI structure to represent resources. However, it should be understood that the techniques described herein may be adapted to a variety of purposes in addition to those specifically described herein. Accordingly, references to specific embodiments are included to be illustrative and not limiting.

FIG. 1 illustrates a computing infrastructure 100, according to an embodiment. As shown, computing infrastructure 100 includes a client computing system 105 and a server system 135, each of which may be connected to a communications network 163.

Illustratively, client computing system 105 may include a memory 107, storage 109, client input/output (I/O) device interface 111, a central processing unit (CPU) 113, and a client network interface 115, all of which may be interconnected via interconnect 117 (e.g., a bus). Although shown as a single computing system, client computing system 105 is included to be representative of a single client or multiple clients. In an embodiment, client computing system 105 may be a thin client. Memory 107 may include a client application 119. Client application 119 may be an online or network application configured for interfacing with server system 135 and other computing systems. Client application 119 may include an application interface 121. Storage 109 may include client application data 123 associated with client application 119. Client I/O device interface 111 may be communicatively coupled to one or more client I/O devices 125. CPU 113 is included in FIG. 1 to be representative of a single CPU, multiple CPUs, a single CPU having multiple processing cores, or the like. Client network interface 115 may receive data from, and may transmit data to, server system 135 via network 163. Client computing system 105 may be configured to interface with other server systems in computing infrastructure 100.

Server system 135 may include a memory 137, storage 139, a server I/O device interface 141, a CPU 143, and a server network interface 145, all of which may be interconnected via interconnect 147 (e.g., a bus). Although shown as a single computing system, server system 135 is included to be representative of a single server system or multiple server systems. Although server system 135 is illustrated in FIG. 1, computing infrastructure 100 may include any number of server systems. Memory 137 may include a server application 149 and a database management system (DBMS) 151. As further described herein, server application 149 may be an application for creating a URI structure according to one or more embodiments. DBMS 151 is included to be representative of a single database management system or multiple database management systems. Storage 139 may include server application data 153, a knowledge base 155, a repository 157, and databases 159. Server application 149 may generate and process server application data 153 based upon interaction with client computing system 105 and/or based upon interaction with one or more other systems via network 163. Server application 149 may send to DBMS 151 a database query request (e.g., a query received from client computing system 105), and DBMS 151 may process such query. DBMS 151 may include a software application configured to manage databases 159. Knowledge base 155 may include attributes relevant to a plurality of resources according to one or more of the various embodiments described herein. Repository 157 may include characteristics extracted from resources processed with respect to a plurality of resources. Databases 159 may include one or more relational databases. Additionally, databases 159 may include one or more ontology trees or other ontological structures. Databases 159 may store the plurality of resources processed according to one or more of the various embodiments described herein. While FIG. 1 illustrates three databases 159, computing infrastructure 100 may include any number of databases. According to an embodiment, DBMS 151 may send one or more requests to remote databases (not shown) via network 163.

Server I/O device interface 141 may be communicatively coupled to one or more server I/O devices 161. CPU 143 is included in FIG. 1 to be representative of a single CPU, multiple CPUs, a single CPU having multiple processing cores, or the like. Server network interface 145 may receive data from, and may transmit data to, client computing system 105 via network 163. Specifically, server application 149 may accept requests sent by client computing system 105 to server system 135 and further may transmit data to client computing system 105 via server network interface 145.

In a further alternative embodiment, one or more functions related to structuring resources according to the various embodiments described herein may be executed externally to server system 135. According to such alternative embodiment, server application 149 may communicate with one or more applications external to server system 135 in order to obtain information or results related to creating a URI structure. Furthermore, according to such alternative embodiment, a database management system and one or more databases external to server system 135 may provide to server application 149 or other components of server system 135 information or capabilities necessary for creating a URI structure.

In a further alternative embodiment, all or some aspects of knowledge base 155 may be stored externally to server system 135. According to such alternative embodiment, server application 149 may communicate with one or more applications external to server system 135 in order to obtain information from knowledge base 155. In a further alternative embodiment, all or some aspects of repository 157 may be stored externally to server system 135. According to such alternative embodiment, server application 149 may communicate with one or more applications external to server system 135 in order to obtain information from repository 157.

Figure 2:
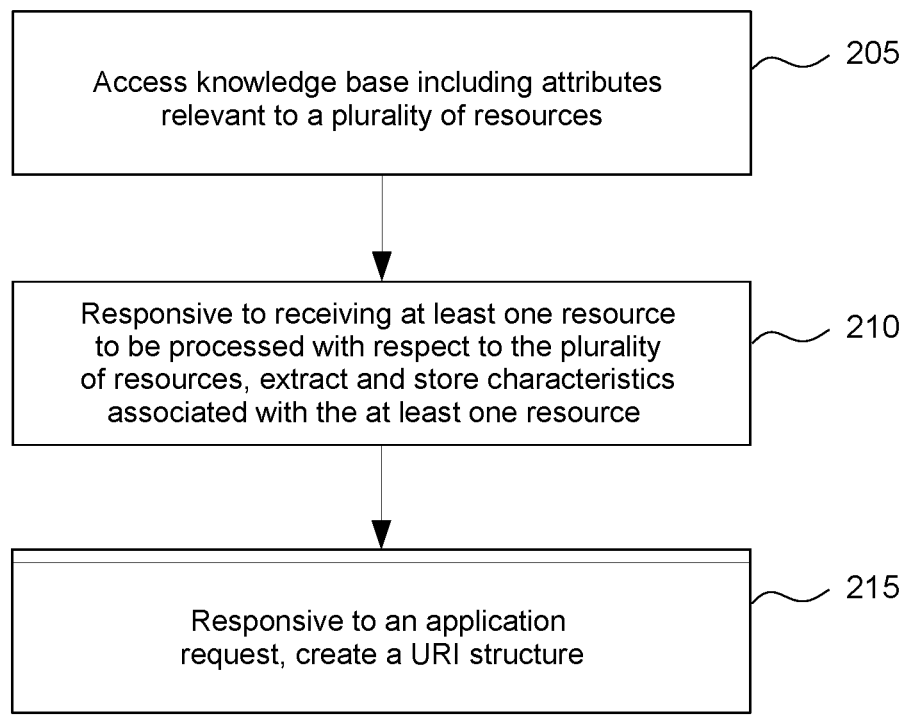
FIG. 2 illustrates a method of structuring resources among a plurality of resources, according to an embodiment.

FIG. 2 illustrates a method 200 of structuring resources among a plurality of resources in a system architecture, according to an embodiment. One or more steps associated with the method 200 may be carried out in a client-server computing environment (e.g., computing infrastructure 100). Additionally or alternatively, one or more steps associated with the method 200 may be carried out within one or more workloads of a cloud computing environment. A server application (e.g., server application 149) may facilitate processing according to the method 200 and the other methods further described herein. Specifically, the server application may be configured to process additions or updates to the plurality of resources. The server application further may be configured to process application requests with respect to the plurality of resources. The server application may be located in a server system in the computing environment (e.g., server system 135). In an embodiment, the plurality of resources may be stored in one or more databases within the server system (e.g., databases 159) and/or may be stored in one or more databases external to the server system.

The method 200 may begin at step 205, where the server application may access a knowledge base (e.g., knowledge base 155 of server system 135). The knowledge base may include attributes relevant to the plurality of resources. In an embodiment, attributes of the knowledge base may include concepts and logical relationships associated with the concepts. The server application may access the knowledge base via a processor of the server system (e.g., CPU 143). According to an embodiment in which the knowledge base is located external to the server system, the server application may process data from the knowledge base upon receipt from a communications network (e.g., network 163) via a server network interface of the server system (e.g., server network interface 145).

Figure 3:
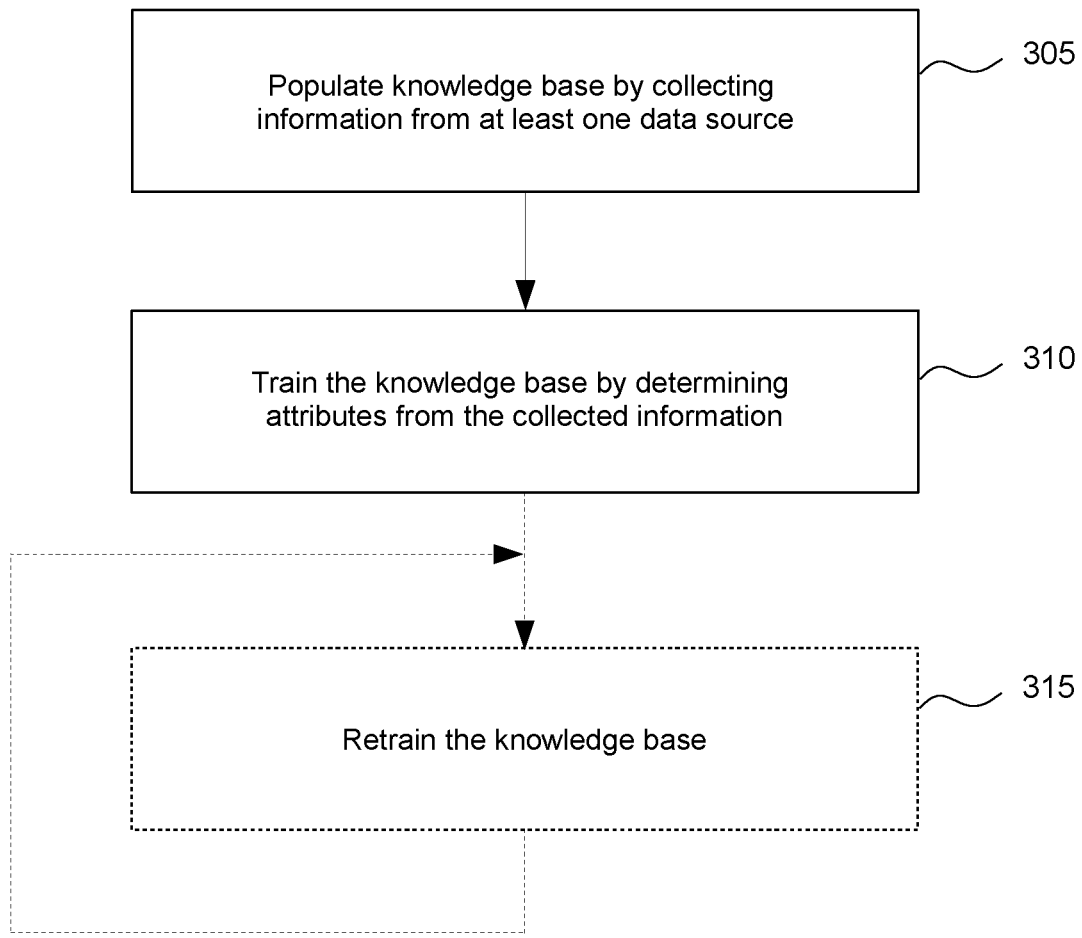
FIG. 3 illustrates a method of establishing a knowledge base, according to an embodiment.

The knowledge base accessed by the server application in the context of step 205 must be established and maintained in order to function properly. FIG. 3 illustrates a method 300 of establishing a knowledge base, according to an embodiment. The knowledge base may include information focusing upon one or more particular subjects, e.g., a medical field. The server application may be configured to establish and maintain the knowledge base.

The method 300 may begin at step 305, where the server application may populate the knowledge base by collecting information from at least one data source. The at least one data source may include a subject matter expert. More specifically, the subject matter expert may manually populate the knowledge base based upon already acquired knowledge and/or based upon dedicated research into one or more subjects relevant to the knowledge base. The at least one data source further may include one or more ontologies, such as WordNet or the Unified Medical Language System (UMLS). For example, UMLS defines many different surface forms for the term "neuroendocrine tumor" (such as "NET", "neuro-endocrine tumor", "neuroendocrine tumor", etc.) and the term "islet cell tumor" (such as "islet cell carcinoma", "islet cell adenocarcinoma", "islet cell adenocarcinoma", etc.). In an embodiment, non-textual data sources, such as audiovisual data sources, may be used. According to such embodiment, the server application may use audiovisual processing to convert some or all of the material within the audiovisual data sources to text.

At step 310, the server application may train the knowledge base by determining attributes from the collected information. The server application may apply one or more training techniques at step 310 to discover concepts and logical relationships associated with such concepts. For example, the server application may use UMLS to determine that an islet cell tumor is a specific kind of neuroendocrine tumor and further to determine that the cancer site of an islet cell tumor is in the pancreas. Additionally or alternatively, the server application may discover concepts and logical relationships from a corpus of existing resources through the use of data mining and/or natural language processing (NLP) techniques. Additionally or alternatively, the server application may discover concepts and logical relationships through the use of one or more machine learning algorithms. Furthermore, the server application may discover concepts and logical relationships through the use of a Hearst Patterns algorithm, which applies lexicosyntactic patterns to recognize hypernymy and hyponymy. Hypernymy and hyponymy, which are exemplary logical relationships which the server application may discover at step 310, pertain to the relationship between a generic term (hypernym) and a specific instance thereof (hyponym). The server application may apply the Hearst Patterns algorithm to extract a hypernymous relationship, and correspondingly a hyponymous relationship, from text. For example, from the text sample "a patient may have any type of neuroendocrine tumor, except for islet cell carcinoma", the server application may apply the Hearst patterns algorithm to determine based on the text sample that a neuroendocrine tumor is a broad category that includes an islet cell tumor. Thus, the server application may determine that a neuroendocrine tumor is a hypernym of an islet cell tumor. Correspondingly, the server application may apply the Hearst patterns algorithm to determine that an islet cell tumor is a specific instance (a hyponym) of a neuroendocrine tumor. Thus, at step 310 the server application may determine attributes relevant to the plurality of resources based upon which resources may be structured per the method 200.

As discussed with respect to the aforementioned training techniques, determining attributes according to step 310 may entail discovery of concepts and logical relationships associated therewith. In an embodiment, the knowledge base may describe a concept via a concept definition. A concept definition may include a concept identifier and one or more concept values. A concept identifier in the context of the various embodiments described herein is a form of organizational entity for standardizing structure among resources. For instance, in the context of music, a concept identifier may include "genre", which may serve to provide structure to resources describing a genre of music. According to another example, in the field of oncology, concept identifiers may include "type" and "site", which may serve to provide structure to resources describing a type or site of a cancerous tumor. A concept value in the context of the various embodiments is a value designated for a corresponding concept identifier. Accordingly, a concept identifier and a corresponding concept value may be determined to be a concept identifier/value pair. In the context of the aforementioned oncology example, "neuroendocrine" and "islet_cell" may be types of cancerous tumors. Therefore, according to the example, "type" and "neuroendocrine" may constitute one concept identifier/value pair, and "type" and "islet_cell" may constitute another concept identifier/value pair. Similarly, "pancreas" may be a site of a cancerous tumor, and hence per the example "site" and "pancreas" may constitute another concept identifier/value pair. Additionally, a concept definition may include one or more logical relationships associated with the concept values and/or associated with the concept identifiers. As discussed above with respect to the training techniques, concept value "neuroendocrine" may be a hypernym of concept value "islet_cell", and thus a hypernymous logical relationship may be defined between concept values "neuroendocrine" and "islet_cell".

Optionally, at step 315, the server application may retrain the knowledge base. In an embodiment, the server application may retrain the knowledge base responsive to collecting new information. For instance, upon receiving a new document, the server application may apply one or more of the training techniques described with respect to step 310 to determine attributes from the new document, and the server application may update one or more aspects of the knowledge base based upon the newly determined attributes. According to a further embodiment, the server application may retrain the knowledge base by tuning aspects of the knowledge base so that the attributes determined at step 310 remain manageable. For instance, data mining techniques and machine learning algorithms may include tuning parameters and may have a capability to prune any data models associated with the knowledge base. The server application may retrain the knowledge base on a periodic basis. Additionally or alternatively, the server application may retrain the knowledge base upon determining that the size of the knowledge base or aspects thereof have exceeded a predetermined threshold.

In an alternative embodiment, the knowledge base may be established or maintained according to the method 300 by one or more applications other than the server application, such as an application external to the server system. According to such alternative embodiment, the server application may interact with such other application(s) in order to transmit data to or receive data from the knowledge base.

Returning to the method 200 illustrated in FIG. 2, at step 210, responsive to receiving at least one resource to be processed with respect to the plurality of resources, the server application may extract characteristics from the at least one resource based upon the attributes of the knowledge base. For instance, according to step 210, the server application may receive one or more new resources to be added to the plurality of resources. Additionally or alternatively, the server application may receive one or more updates to be applied to one or more existing resources among the plurality of resources. In an embodiment, the characteristics extracted according to step 210 may include concept identifiers and concept values that correspond to concepts of the knowledge base. Accordingly, the server application may determine details about the extracted characteristics by processing the extracted characteristics based upon attributes of the knowledge base. Moreover, at step 210 the server application may further process the at least one received resource by storing the extracted characteristics in a repository (e.g., repository 157).

FIG. 4 illustrates a table 400 including characteristics extracted and stored at step 210, according to an example implementation. While the example implementation addresses oncology-related resources, characteristics may be extracted in a similar manner from resources related to additional or alternative fields. The rows of table 400 provide information regarding respective concept identifier/value pairs extracted from resources, in this particular example three resources "document-001", "document-002", and "document-003". Table 400 includes column 405, which includes cells indicating respective resources from which characteristics are extracted. Table 400 further includes column 415, which includes cells indicating respective concept identifiers extracted from the resources. As illustrated in FIG. 4, column 415 indicates that three "type" concept identifiers are extracted and further indicates that two "site" concept identifiers are extracted. Table 400 further indicates column 425, which includes cells indicating respective concept values extracted from the resources.

Based upon the rows and columns as described, as illustrated in FIG. 4, table 400 indicates that the server application has extracted from "document-001" a concept identifier "type" with a concept value of "neuroendocrine". Table 400 further indicates that the server application has extracted from "document-001" a concept identifier "site" with a concept value of "pancreas". Furthermore, table 400 indicates that the server application has extracted from "document-002" a concept identifier "type" with a concept value of "islet_cell". Additionally, table 400 indicates that the server application has extracted from "document-003" a concept identifier "type" with a concept value of "Merkel_cell". Finally, table 400 indicates that the server application has extracted from "document-003" a concept identifier "site" with a concept value of "skin". Thus, as illustrated in table 400, the server application may extract characteristics from resources based upon attributes of the knowledge base in order to determine three types of cancerous tumor: neuroendocrine, islet cell, and Merkel cell. Furthermore, the server application may extract characteristics from resources based upon attributes of the knowledge base in order to determine two cancer sites: pancreas and skin.

At step 215 of the method 200, responsive to an application request, the server application may create a URI structure. In an embodiment, the application request may be in the form of a request URI from a client. More specifically, the application request may assume the form of a request Uniform Resource Locator (URL) or a request Uniform Resource Name (URN) from a client. The URI structure may represent at least one matching resource among the plurality of resources that corresponds to the application request. Specifically, the URI structure may reflect at least one characteristic of the at least one matching resource. In an embodiment, as further described herein with respect to FIG. 5, the URI structure may include hierarchical aspects to reflect one or more logical relationships between concepts. In an embodiment, one or more aspects of the URI structure may be stored within server application data of the server system (e.g., server application data 153). Additionally or alternatively, one or more aspects of the URI structure may be stored externally to the server system.

The server application may identify at least one matching resource that corresponds to the application request by analyzing one or more characteristics of the respective resources among the plurality of resources that previously were extracted and stored according to step 210. The server application may identify at least one matching resource in various ways depending upon the contents of the application request. In an embodiment, the server application may identify at least one matching resource by comparing one or more characteristics of the application request with one or more characteristics of the respective resources among the plurality of resources. The server application may utilize information from the knowledge base to ensure that minor language variations between one or more characteristics of the application request and one or more characteristics of the respective resources do not prevent proper identification of the at least one matching resource. According to such embodiment, in the event that there are one or more logical relationships included within the application request, based upon information obtained from the knowledge base, the server application may identify at least one matching resource by determining the presence of any such logical relationship(s) between one or more characteristics of the application request and one or more characteristics of the respective resources among the plurality of resources.

Figure 5:
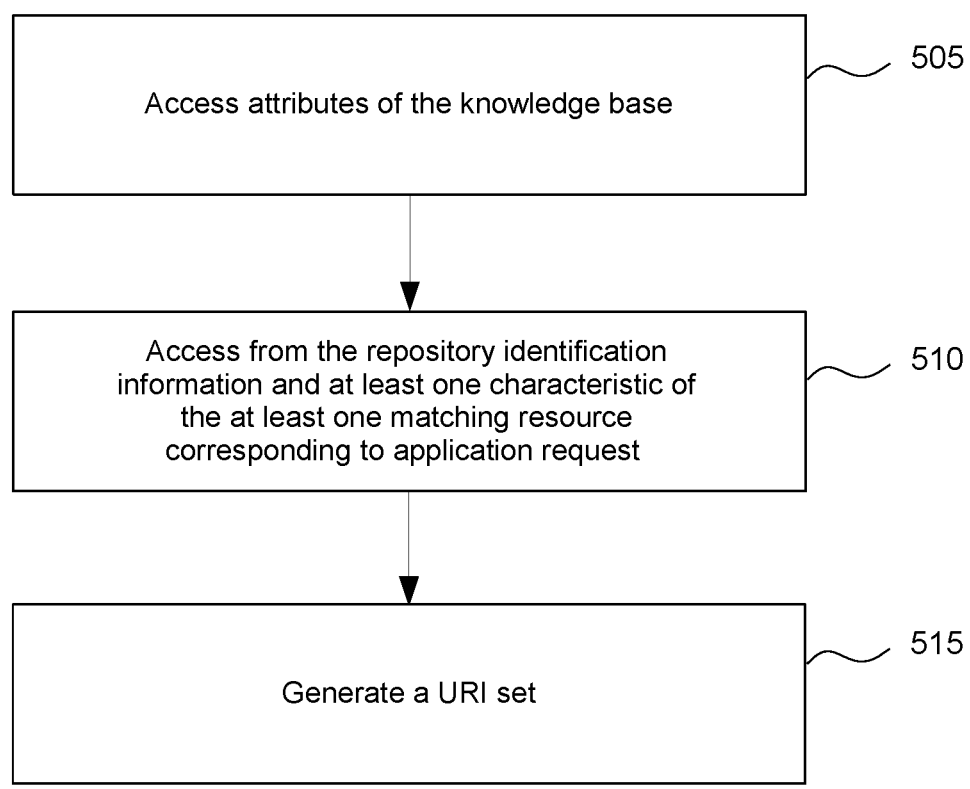
FIG. 5 illustrates a method of creating a Uniform Resource Identifier (URI) structure to represent resources among a plurality of resources, according to an embodiment.

FIG. 5 illustrates a method 500 of creating a URI structure, according to an embodiment. The method 500 provides an example embodiment with respect to step 215 of the method 200. The method 500 may begin at step 505, where the server application may access the attributes of the knowledge base. The accessed attributes of the knowledge base may enable the server application to properly identify any concepts and/or any logical relationships that may be associated with the application request. At step 510, the server application may access from the repository identification information and at least one characteristic of the at least one matching resource among the plurality of resources that corresponds to the application request.

At step 515, the server application may generate a URI set based upon the attributes of the knowledge base. The URI set may include a single URI or multiple URIs. The URI set may include one or more URLs. Additionally or alternatively, the URI set may include one or more URNs. The URI set generated at step 515 may include at least one URI path reflecting the at least one characteristic of the at least one matching resource. Specifically, the at least one path may include respective concept identifiers and/or concept values associated with the at least one matching resource. The server application may apply the attributes of the accessed knowledge base to ensure that the at least one characteristic of the at least one matching resource is properly represented hierarchically within the at least one path of the URI set. The at least one path of the URI set may reveal latent concepts among the at least one matching resource. Moreover, each of the at least one path of the URI set may constitute a container in which the at least one matching resource may be dynamically organized by the server application in order to facilitate access thereto in response to the application request. Based upon information in the knowledge base, the at least one path of the URI set may include standardized language to reflect the at least one characteristic of at least one matching resource. Such standardized language may prevent potential ambiguity with respect to interpretation of language within the at least one path.

In an embodiment, the at least one characteristic reflected by the at least one URI path of the URI set generated at step 515 may include one or more logical relationships associated with the at least one matching resource. More specifically, one or more paths among the at least one path may include language indicating a logical relationship associated with a particular concept value, a particular concept identifier, and/or a particular concept identifier/value pair. More specifically, one or more paths among the at least one path may include language indicating a logical relationship between a concept value and another concept value. Moreover, as further described herein, one or more paths among the at least one path may include logical relationship(s) associated with any concept identifier/value pair provided within the application request. The at least one path of the URI set may reveal one or more latent logical relationships among concepts associated with the at least one matching resource. Accordingly, the URI set may reflect a hierarchy that provides structure with respect to the at least one matching resource as well as the plurality of resources more generally.

In a further embodiment, the at least one URI path of the URI set generated at step 515 may reflect at least one characteristic that is at least one hierarchical level beyond (i.e., at least one hierarchical level above or below) a hierarchical level of the at least one characteristic of the at least one matching resource. More specifically, one or more paths among the at least one path may include a concept value that has a hypernymous logical relationship with respect to another concept value. For instance, the server application may generate a URI having a path that includes two concept values, wherein one of the two concept values (e.g., a concept value from the application request) is a hypernym of the other concept value (e.g., a concept value associated with a matching resource).

FIG. 6 illustrates a table 600 including respective URI sets generated per steps of the method 500 in response to various example application requests, according to an example implementation. The server application may apply one or more rules to generate a URI set per the various embodiments described herein. The respective URI sets generated according to the example implementation are based upon the characteristics extracted from the resources "document-001", "document-002", and "document-003", as previously illustrated and described with respect to table 400 in FIG. 4. While only characteristics extracted from the resources "document-001", "document-002", and "document-003" are contemplated for purposes of the example application requests, any resource among the plurality of resources may be considered in the context of generating a URI set per the various embodiments described herein. Various example application requests are presented in respective cells of column 605 of table 600. Corresponding responses to the example application requests, including path(s) of respective URI sets and matching resource(s) represented by the respective URI sets, are presented in respective cells of column 615.

According to one rule, in the event that a concept identifier terminates a request URI of an application request without any logical relationship identified within the request URI, the server application may generate a URI set including at least one path, wherein each of the at least one path terminates with a respective concept value corresponding to the concept identifier. As illustrated in row 625 of table 600, according to a first example, the server application may receive an application request including the request URI "/type". In this case, the concept identifier "type" terminates the request URI. In response, the server application may identify "document-001", "document-002", and "document-003" as matching resources that correspond to the request URI. Specifically, the server application may determine that each of "document-001", "document-002", and "document-003" respectively includes concept identifier "type" as provided in the request URI, and thus each resource respectively includes a characteristic that matches a characteristic as provided in the application request. Based upon the knowledge base accessed at step 505 and characteristics of the matching resources accessed at step 510, at step 515 the server application may generate a URI set including the paths "/type/neuroendocrine", "/type/islet_cell", and "/type/Merkel_cell". The paths respectively terminate with concept values corresponding to concept identifier "type". In addition, the paths reflect characteristics of the matching resources, namely concept values "neuroendocrine", "islet_cell", and "Merkel_cell". In sum, in response to the request URI, the server application may generate a URI set as illustrated in row 625 that represents matching resources "document-001", "document-002", and "document-003" and that includes paths terminating with respective concept values corresponding to the concept identifier in the request URI, specifically concept values "neuroendocrine", "islet_cell", and "Merkel_cell" corresponding to concept identifier "type".

As illustrated in row 635 of table 600, according to a second example, the server application may receive an application request including the request URI "/site". In this case, the concept identifier "site" terminates the request URI. In response, the server application may identify "document-001" and "document-003" as matching resources that correspond to the request URI. Specifically, the server application may determine that each of "document-001" and "document-003" respectively includes concept identifier "site" as provided in the request URI, and thus each resource respectively includes a characteristic that matches a characteristic as provided in the application request. Based upon the knowledge base accessed at step 505 and characteristics of the matching resources accessed at step 510, at step 515 the server application may generate a URI set including the paths "/site/pancreas" and "/site/skin". The paths respectively terminate with concept values corresponding to concept identifier "site". Additionally, the paths reflect characteristics of the matching resources, namely concept values "pancreas" and "skin". In sum, in response to the request URI, the server application may generate a URI set as illustrated in row 635 that represents matching resources "document-001" and "document-003" and that includes paths respectively terminating with concept values corresponding to the concept identifier in the request URI, specifically concept values "pancreas" and "skin" corresponding to concept identifier "site".

According to a further rule, in the event that a concept value terminates a request URI of an application request, the server application may generate a URI set including at least one path, wherein each of the at least one path terminates with a respective logical relationship associated with the concept identifier/value pair provided within the request URI. As illustrated in row 645 of table 600, according to a third example, the server application may receive an application request including the request URI "/type/neuroendocrine". In this case, the concept value "neuroendocrine" corresponding to concept identifier "type" terminates the request URI. In response, the server application may identify "document-001", "document-002", and "document-003" as matching resources that correspond to the request URI. Specifically, the server application may determine that "document-001" includes characteristics that match the "type" and "neuroendocrine" characteristics as provided in the request URI, and based upon the knowledge base accessed at step 505 the server application further may determine that "document-002" and "document-003" include characteristics that are logically related to the "neuroendocrine" characteristic as provided in the request URI ("neuroendocrine" is a hypernym of "islet_cell" in "document-002" and also is a hypernym of "Merkel_cell" in "document-003"). Based upon the knowledge base accessed at step 505 and characteristics of the matching resources accessed at step 510, at step 515 the server application may generate a URI set including the path "/type/neuroendocrine/hypernym". The generated path terminates with logical relationship identifier "hypernym", which reflects a hypernymous logical relationship associated with the concept identifier/value pair in the request URI, namely concept value "neuroendocrine" and corresponding concept identifier "type". Moreover, the path reflects a characteristic of the matching resources, namely the hypernymous logical relationship associated with the concept identifier/value pair in the request URI. Specifically, the path indicates that concept value "neuroendocrine" is a hypernym of at least one other concept value in the plurality of resources. In sum, in response to the request URI, the server application may generate a URI set as illustrated in row 645 that represents matching resources "document-001", "document-002", and "document-003" and that includes a path terminating with a hypernymous logical relationship associated with the concept identifier/value pair in the request URI, specifically concept value "neuroendocrine" corresponding to concept identifier "type".

According to a further rule, in the event that a logical relationship associated with a concept value terminates a request URI of an application request, the server application may generate a URI set including at least one path, wherein each of the at least one path terminates with a respective concept identifier that shares the logical relationship identified in the request URI with the concept identifier/value pair provided within the request URI. As illustrated in row 655 of table 600, according to a fourth example, the server application may receive an application request including the request URI "/type/neuroendocrine/hypernym". In this case, a logical relationship, specifically a hypernymous relationship indicated by the term "hypernym", terminates the request URI. In response, the server application may identify "document-002" and "document-003" as matching resources that correspond to the application request to the request URI. Specifically, based upon the knowledge base accessed at step 505, the server application may determine that "document-002" and "document-003" include characteristics that have a hypernymous logical relationship with respect to the "neuroendocrine" characteristic of the request URI ("neuroendocrine" is a hypernym of "islet_cell" in "document-002" and also is a hypernym of "Merkel_cell" in "document-003"). Based upon the "hypernym" logical relationship identifier in the request URI, the knowledge base accessed at step 505, and characteristics of the matching resources accessed at step 510, at step 515 the server application may generate a URI set including a path "hype/neuroendocrine/hypernym/type". The generated path terminates with concept identifier "type", which is logically related in a hypernymous sense to the concept identifier/value pair in the request URI, namely concept value "neuroendocrine" and corresponding concept identifier "type". The path further reflects characteristics of the matching resources accessed at step 510, namely the terminating concept identifier "type" and the hypernymous logical relationship shared between the terminating concept identifier and the concept identifier/value pair in the request URI. In sum, in response to the request URI, the server application may generate a URI set as illustrated in row 655 that represents matching resources "document-002" and "document-003" and that includes a path terminating with a concept identifier "type" which is logically related in a hypernymous sense to the concept identifier/value pair in the request URI, specifically concept value "neuroendocrine" corresponding to concept identifier "type".

According to a further rule, in the event that a concept identifier terminates a request URI of an application request that has a logical relationship identified within the request URI, the server application may generate a URI set including at least one path, wherein each of the at least one path terminates with a respective concept value that shares the logical relationship identified in the request URI with the concept identifier/value pair provided within the request URI. As illustrated in row 665 of table 600, according to a fifth example, the server application may receive an application request including the request URI "hype/neuroendocrine/hypernym/type". In this case, a concept identifier "type" terminates the request URI, and furthermore a logical relationship, specifically a hypernymous relationship indicated by the term "hypernym", is identified within the request URI. In response, the server application may identify "document-002" and "document-003" as matching resources that correspond to the request URI. Specifically, based upon the knowledge base accessed at step 505, the server application may determine that "document-002" and "document-003" include characteristics that have a hypernymous logical relationship with respect to the "neuroendocrine" characteristic of the request URI ("neuroendocrine" is a hypernym of "islet_cell" in "document-002" and also is a hypernym of "Merkel_cell" in "document-003"). Based upon the "hypernym" logical relationship identifier in the request URI, the knowledge base accessed at step 505, and characteristics of the matching resources accessed at step 510, at step 515 the server application may generate a URI set including a first path "/type/neuroendocrine/hypernym/type/islet_cell" and a second path "hype/neuroendocrine/hypernym/type/Merkel_cell". The first path terminates with concept value "islet_cell", which shares a hypernymous logical relationship with the concept identifier/value pair in the request URI, specifically concept value "neuroendocrine" and corresponding concept identifier "type". The second path terminates with concept value "Merkel_cell", which also shares a hypernymous logical relationship with the concept identifier/value pair in the request URI. The paths further reflect characteristics of the matching resources. Specifically, the first path reflects the terminating concept value "islet_cell" and corresponding concept identifier "type", and the second path reflects the terminating concept value "Merkel_cell" and corresponding concept identifier "type". Moreover, each of the paths respectively reflects a hypernymous logical relationship shared between the respective terminating concept value and the concept identifier/value pair in the request URI. In sum, in response to the request URI, the server application may generate a URI set as illustrated in row 665 that represents matching resources "document-002" and "document-003" and that includes a first path terminating with concept value "islet_cell" and a second path terminating with concept value "Merkel_cell". The paths respectively indicate that a neuroendocrine tumor is a hypernym of an islet cell tumor and that a neuroendocrine tumor is a hypernym of a Merkel cell tumor.

As illustrated in row 675 of table 600, according to a sixth example, the server application may receive an application request including the request URI "/site/pancreas/site-tumors/type". In this case, a concept identifier "type" terminates the request URI, and furthermore a logical relationship, specifically a locational relationship indicated by the term "site-tumors", is identified within the request URI. In response, the server application may determine that "document-002" is a matching resource that corresponds to the request URI. Specifically, based upon the knowledge base accessed at step 505, the server application may determine that "document-002" includes a characteristic that has a locational logical relationship with respect to a characteristic of the request URI ("pancreas" is a tumor site of "islet_cell" in "document-002") Based upon the "site-tumors" logical relationship identifier in the request URI, the knowledge base accessed at step 505, and characteristics of the matching resource accessed at step 510, at step 515 the server application may generate a URI set including a path "/site/pancreas/site-tumors/type/islet_cell". The generated path terminates with concept value "islet_cell", which shares a locational (specifically, a tumor site) logical relationship with the concept identifier/value pair provided in the request URI, namely concept value "pancreas" and corresponding concept identifier "site". The path further reflects the characteristics of matching resource "document-002", namely the terminating concept value "islet_cell" and corresponding concept identifier "type". Moreover, the generated path reflects the locational logical relationship shared between the terminating concept value and the concept identifier/value pair in the request URI. In sum, in response to the request URI, the server application may generate a URI set as illustrated in row 675 that represents matching resource "document-002" and that includes a path terminating with concept value "islet_cell". The path indicates that the pancreas is a location of an islet cell tumor.

As indicated by the above examples indicated in table 600, in response to an application request, at step 515 of the method 500 the server application may generate a URI set reflecting at least one characteristic of at least one matching resource corresponding to the application request. More specifically, based upon the accessed knowledge base, the at least one path of the URI set may reflect in a hierarchical structure one or more concepts and any associated logical relationships. By creating a URI structure according to the method 500, the server application may respond to an application request by organizing various concepts and logical relationships associated with a plurality of resources which otherwise could be latent or inaccessible. The rules applied to generate the respective URI sets in the context of the examples illustrated in table 600 are not exhaustive; the server application may apply variations of the applied rules or may apply alternative rules in accordance with the various embodiments described herein.

The descriptions of the various embodiments of the present invention have been presented for purposes of illustration but are not intended to be exhaustive or limited to the embodiments disclosed. All kinds of modifications made to the described embodiments and equivalent arrangements should fall within the protected scope of the invention. Hence, the scope of the invention should be explained most widely according to the claims that follow in connection with the detailed description, and should cover all possibly equivalent variations and equivalent arrangements.

Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method comprising:
   accessing, via a processor, a knowledge base including attributes relevant to a plurality of resources in a system architecture;
   responsive to receiving at least one resource to be processed with respect to the plurality of resources, extracting characteristics from the at least one resource based upon the attributes of the knowledge base, and storing the extracted characteristics in a repository; and
   responsive to an application request in the form of a Uniform Resource Identifier (URI) path:
   identifying at least one matching resource among the plurality of resources that corresponds to the application request; and
   generating a URI set based upon the attributes of the knowledge base, wherein the URI set includes at least one textual URI path referencing at least one characteristic of the at least one matching resource based upon one or more rules applied with respect to text of the application request, and wherein each of the at least one textual URI path includes the text of the application request.

2. The method of claim 1, wherein establishing the knowledge base comprises:
   populating the knowledge base by collecting information from at least one data source; and
   training the knowledge base by determining attributes from the collected information.

3. The method of claim 2, wherein establishing the knowledge base further comprises:
   retraining the knowledge base.

4. The method of claim 1, wherein the attributes of the knowledge base comprise concepts and logical relationships associated with the concepts.

5. The method of claim 4, wherein the extracted characteristics comprise concept identifiers and concept values defined for the concepts of the knowledge base.

6. The method of claim 1, wherein the at least one characteristic reflected by the at least one textual URI path includes one or more logical relationships associated with the at least one matching resource.

7. The method of claim 1, wherein the at least one textual URI path reflects at least one characteristic that is at least one hierarchical level beyond a hierarchical level of the at least one characteristic of the at least one matching resource.

8. The method of claim 1, wherein one or more paths among the at least one textual URI path reflect characteristics among the at least one characteristic of the at least one matching resource that have a hypernymous logical relationship or a locational logical relationship.

9. A computer program product comprising a computer readable storage medium having program instructions embodied therewith, the program instructions executable by a computing device to cause the computing device to:
   access a knowledge base including attributes relevant to a plurality of resources in a system architecture;
   responsive to receiving at least one resource to be processed with respect to the plurality of resources, extract characteristics from the at least one resource based upon the attributes of the knowledge base, and store the extracted characteristics in a repository; and
   responsive to an application request in the form of a Uniform Resource Identifier (URI) path:
   identify at least one matching resource among the plurality of resources that corresponds to the application request; and
   generate a URI set based upon the attributes of the knowledge base, wherein the URI set includes at least one textual URI path referencing at least one characteristic of the at least one matching resource based upon one or more rules applied with respect to text of the application request, and wherein each of the at least one textual URI path includes the text of the application request.

10. The computer program product of claim 9, wherein the attributes of the knowledge base comprise concepts and logical relationships associated with the concepts.

11. The computer program product of claim 10, wherein the extracted characteristics comprise concept identifiers and concept values defined for the concepts of the knowledge base.

12. The computer program product of claim 9, wherein the at least one characteristic reflected by the at least one textual URI path includes one or more logical relationships associated with the at least one matching resource.

13. The computer program product of claim 9, wherein the at least one textual URI path reflects at least one characteristic that is at least one hierarchical level beyond a hierarchical level of the at least one characteristic of the at least one matching resource.

14. The computer program product of claim 9, wherein one or more paths among the at least one textual URI path reflect characteristics among the at least one characteristic of the at least one matching resource that have a hypernymous logical relationship or a locational logical relationship.

15. A system comprising:
   a processor; and
   a memory storing an application program, which, when executed on the processor, performs an operation comprising:
   accessing, via a processor, a knowledge base including attributes relevant to a plurality of resources in a system architecture;
   responsive to receiving at least one resource to be processed with respect to the plurality of resources, extracting characteristics from the at least one resource based upon the attributes of the knowledge base, and storing the extracted characteristics in a repository; and
   responsive to an application request in the form of a Uniform Resource Identifier (URI) path:
   identifying at least one matching resource among the plurality of resources that corresponds to the application request; and
   generating a URI set based upon the attributes of the knowledge base, wherein the URI set includes at least one textual URI path referencing at least one characteristic of the at least one matching resource based upon one or more rules applied with respect to text of the application request, and wherein each of the at least one textual URI path includes the text of the application request.

16. The system of claim 15, wherein the attributes of the knowledge base comprise concepts and logical relationships associated with the concepts.

17. The system of claim 16, wherein the extracted characteristics comprise concept identifiers and concept values defined for the concepts of the knowledge base.

18. The system of claim 15, wherein the at least one characteristic reflected by the at least one textual URI path includes one or more logical relationships associated with the at least one matching resource.

19. The system of claim 15, wherein the at least one textual URI path reflects at least one characteristic that is at least one hierarchical level beyond a hierarchical level of the at least one characteristic of the at least one matching resource.

20. The system of claim 15, wherein one or more paths among the at least one textual URI path reflect characteristics among the at least one characteristic of the at least one matching resource that have a hypernymous logical relationship or a locational logical relationship.

\* \* \* \* \*